United States Patent
Li et al.

(10) Patent No.: US 10,454,592 B2
(45) Date of Patent: Oct. 22, 2019

(54) OPTICAL INTERCONNECT IN SPIN-BASED COMPUTATION AND COMMUNICATION SYSTEMS

(71) Applicant: Regents of the University of Minnesota, Minneapolis, MN (US)

(72) Inventors: Mo Li, Plymouth, MN (US); Jian-Ping Wang, Shoreview, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 15/972,357

(22) Filed: May 7, 2018

(65) Prior Publication Data

US 2018/0254836 A1    Sep. 6, 2018

Related U.S. Application Data

(63) Continuation of application No. 14/279,990, filed on May 16, 2014, now Pat. No. 9,967,038.

(51) Int. Cl.
  *H04B 10/532* (2013.01)
  *H04B 10/80* (2013.01)
  *H04B 10/67* (2013.01)

(52) U.S. Cl.
  CPC ......... *H04B 10/801* (2013.01); *H04B 10/532* (2013.01); *H04B 10/671* (2013.01)

(58) Field of Classification Search
  CPC .. H04B 10/532; H04B 10/801; H04B 10/671; H01L 43/08; B82Y 25/00; H04J 14/06; H03B 15/006; G01R 33/09
  USPC ........ 398/152, 141, 164, 184, 205, 135, 138
  See application file for complete search history.

(56) References Cited

U.S. PATENT DOCUMENTS

| | | | | |
|---|---|---|---|---|
| 4,246,474 A | * | 1/1981 | Lazzari | G11B 5/3903 235/450 |
| 6,111,715 A | * | 8/2000 | Tsuchiya | G11B 5/00813 360/61 |
| 6,545,329 B1 | * | 4/2003 | Lannon, Jr. | B82Y 25/00 257/414 |
| 6,594,068 B2 | | 7/2003 | Sui | |

(Continued)

OTHER PUBLICATIONS

Alebrand et al., "All-optical Magnetization Switching Using Phase Shaped Ultrashort Laser Pulses," physica status solidi (a), vol. 209(12), Oct. 2012, pp. 2589-2595.

(Continued)

*Primary Examiner* — Hibret A Woldekidan
(74) *Attorney, Agent, or Firm* — Shumaker & Sieffert, P.A.

(57) ABSTRACT

Techniques are described for data transfer in spin-based systems where digital bit values are represented by magnetization states of magnetoresistive devices rather than voltages or currents. For data transmission, a spin-based signal is converted to an optical signal and transmitted via an optical transport. For data reception, the optical signal is received via the optical transport and converted back to a spin-based signal. Such data transfer may not require an intervening conversion of the spin-based signal to charge-based signal that relies on voltages or currents to represent digital bit values. In addition, techniques are described to use magnetoresistive devices to control the amount of current or voltage that is delivered, where the magnetization state of the magnetoresistive device is set by an optical signal.

20 Claims, 8 Drawing Sheets

(56) References Cited

U.S. PATENT DOCUMENTS

| | | | |
|---|---|---|---|
| 6,646,774 B1 | 11/2003 | Willner et al. | |
| 6,871,023 B2 | 3/2005 | Atmur et al. | |
| 7,855,555 B2* | 12/2010 | Biziere | G01R 33/09 |
| | | | 324/207.21 |
| 8,558,571 B2 | 10/2013 | Behin-Aein et al. | |
| 8,634,233 B2 | 1/2014 | Lilja et al. | |
| 8,766,733 B2* | 7/2014 | Cyrille | H03B 15/006 |
| | | | 331/94.1 |
| 9,087,613 B2 | 7/2015 | Sohn et al. | |
| 9,240,799 B1 | 1/2016 | Wang et al. | |
| 9,299,409 B2* | 3/2016 | Miyakawa | G11C 11/161 |
| 9,425,738 B2* | 8/2016 | Wang | H03B 15/006 |
| 9,530,822 B2* | 12/2016 | Shukh | H01L 27/224 |
| 9,660,582 B2* | 5/2017 | Wang | H03B 15/006 |
| 9,967,038 B2* | 5/2018 | Li | H04B 10/671 |
| 2002/0003651 A1 | 1/2002 | Sui | |
| 2002/0009254 A1* | 1/2002 | Sui | G02B 27/288 |
| | | | 385/16 |
| 2002/0044353 A1 | 4/2002 | Salzman | |
| 2004/0100695 A1 | 5/2004 | Schmidt et al. | |
| 2004/0196704 A1 | 10/2004 | Andrei et al. | |
| 2006/0002037 A1 | 1/2006 | Zayets | |
| 2006/0245242 A1 | 11/2006 | Rizzo et al. | |
| 2009/0209102 A1 | 8/2009 | Zhong et al. | |
| 2011/0075839 A1 | 3/2011 | Noh | |
| 2012/0306034 A1 | 12/2012 | Meng et al. | |
| 2013/0061102 A1 | 3/2013 | Sohn et al. | |
| 2013/0227344 A1 | 8/2013 | Sohn et al. | |
| 2013/0311717 A1* | 11/2013 | Kim | G06F 12/0246 |
| | | | 711/104 |
| 2014/0270758 A1* | 9/2014 | Nejadmalayeri | H04L 5/14 |
| | | | 398/41 |
| 2016/0094296 A1* | 3/2016 | Hongou | H04B 10/58 |
| | | | 398/25 |
| 2016/0197120 A1* | 7/2016 | Miyakawa | G11C 11/161 |
| | | | 257/252 |
| 2016/0212510 A1 | 7/2016 | Bogoni et al. | |
| 2018/0102475 A1* | 4/2018 | Shibata | H01F 10/329 |

OTHER PUBLICATIONS

Alebrand et al., "Interplay of Heating and Helicity in All-optical Magnetization Switching," Physical Review B, vol. 85(9), Mar. 2012, 7 pp.

Alebrand et al., "Light-induced Magnetization Reversal of High-anisotropy TbCo Alloy Films," Applied Physics Letters, vol. 101(16), Oct. 2012, 4 pp.

Alebrand et al., "Subpicosecond Magnetization Dynamics in TbCo Alloys," Physical Review B 89, 144404, No. 14, Apr. 2014, 7 pp.

Atxitia et al., "Landau-Lifshitz-Bloch Equation for Ferrimagnetic Materials," Physical Review B, vol. 86(10), Jun. 2012, 13 pp.

Atxitia et al., "Ultrafast Dynamical Path for the Switching of a Ferrimagnet after Femtosecond Heating," Physical Review B, vol. 87(22), Jun. 2013, 4 pp.

Bakaul et al., "Engineering Magnetic Domains in Manganite Thin Films by Laser Interference," Applied Physics Letters, vol. 100(1), Jan. 2012, 5 pp.

Beaurepaire et al., "Ultrafast Spin Dynamics in Ferromagnetic Nickel," Physical Review Letters, vol. 76(22), May 1996, 5 pp.

Carpene et al., "All-optical Subnanosecond Coherent Spin Switching in Thin Ferromagnetic Layers," Physical Review B, vol. 84(13), Oct. 2011, 10 pp.

Cheng et al., "Temperature Dependence of All-Optical Ultrafast Magnetization Switching in TbFeCo," Magnetics, IEEE Transactions on, vol. 48(11), Nov. 2012, pp. 3387-3389.

Dadoenkova et al., "Electric Field Controlled Faraday Rotation in an Electro-optic/Magneto-optic Bilayer," Applied Physics Letters, vol. 97(1), Jul. 2010, 4 pp.

De Jong et al., "Laser-induced Ultrafast Spin Dynamics in ErFeO 3," Physical Review B, vol. 84(10), Sep. 2011, 10 pp.

Evans et al., "Ultrafast Thermally Induced Magnetic Switching in Synthetic Ferrimagnets," Applied Physics Letters, vol. 104(8), 082410, Feb. 2014, 4 pp.

Finazzi et al., "Laser-induced Magnetic Nanostructures with Tunable Topological Properties," Physical Review Letters, vol. 110(17), 177205, Apr. 2013, 7 pp.

Gerrits et al., "Ultrafast Precessional Magnetization Reversal by Picosecond Magnetic Field Pulse Shaping," Nature, vol. 418(6897), Aug. 2002, pp. 509-512.

Gomez-Abal et al., "All-optical Subpicosecond Magnetic Switching in NiO (001)," Physical Review Letters, vol. 92(22), Jun. 2004, 6 pp.

Graves et al., "Nanoscale Spin Reversal by Non-local Angular Momentum Transfer Following Ultrafast Laser Excitation in Ferrimagnetic GdFeCo," Nature materials, vol. 12(4), Apr. 2013, pp. 293-298.

Gridnev, "Optical Spin Pumping and Magnetization Switching in Ferromagnets," Physical Review B, vol. 88(1), 014405, Jul. 2013, 8 pp.

Hashimoto et al., "Photo-induced Precession of Magnetization in Ferromagnetic (Ga, Mn) As," Physical Review Letters, vol. 100(6), Feb. 2013, 4 pp.

Hassdenteufel et al., "All-optical Helicity Dependent Magnetic Switching in Tb—Fe Thin Films with a MHz Laser Oscillator," Optics Express, vol. 22(8), Apr. 2014, 9 pp.

He et al., "On-Chip Synthesis of Circularly Polarized Emission of Light with Integrated Photonic Circuits," Optics letters vol. 39(9), May 2014, pp. 2553-2556.

Hertel, "Viewpoint: For Faster Magnetic Switching—Destroy and Rebuild," Physics, vol. 2(73), Sep. 2009, 3 pp.

Hohfeld et al., "Athermal All-optical Femtosecond Magnetization Reversal in GdFeCo," Applied Physics Letters, vol. 94(15), Apr. 2009, 6 pp.

Jin et al., "Ultrafast All-optical Magnetic Switching in NaTb (WO 4) 2," Applied Physics Letters, vol. 96(20), May 2010, 5 pp.

Khorsand et al., "Element-specific Probing of Ultrafast Spin Dynamics in Multisublattice Magnets with Visible Light," Physical Review Letters, vol. 110(10), 107205, Mar. 2013, 5 pp.

Khorsand et al., "Optical Excitation of Thin Magnetic Layers in Multilayer Structures," Nature materials, vol. 13(2), Jan. 2014, pp. 101-102.

Khorsand et al., "Role of Magnetic Circular Dichroism in All-optical Magnetic Recording," Physical Review Letters, vol. 108(12), 127205, Mar. 2012, 5 pp.

Kim et al., "Ultrafast Spin Demagnetization by Nonthermal Electrons of TbFe Alloy Film," Applied Physics Letters, vol. 94(19), May 2009, 5 pp.

Kimel et al., "Inertia-driven Spin Switching in Antiferromagnets," Nature Physics, vol. 5(10), Aug. 2009, pp. 727-731.

Kimel et al., "Laser-induced Ultrafast Spin Reorientation in the Antiferromagnet TmFeO3," Nature, vol. 429(6994), Jun. 2004, pp. 850-853.

Kimel et al., "Ultrafast Non-thermal Control of Magnetization by Instantaneous Photomagnetic Pulses," Nature, vol. 435(7042), Mar. 2005, 3 pp.

Kimel, "All-optical switching: Three rules of design," Nature materials, Mar. 2014, 2 pp.

Kirilyuk et al., "Laser-induced Magnetization Dynamics and Reversal in Ferrimagnetic Alloys," Reports on Progress in Physics, vol. 76(2), 026501, Feb. 2013, 38 pp.

Kirilyuk et al., "Ultrafast Optical Manipulation of Magnetic Order," Reviews of Modern Physics, vol. 82(3), Sep. 2010, 54 pp.

Kohmoto et al., "Optically Induced Magnetization and Ultrafast Spin Relaxation in Manganese Oxide," Physical Review B, vol. 78(14), Oct. 2008, 8 pp.

Kovalenko et al., "New Concept for Magnetization Switching by Ultrafast Acoustic Pulses," Physical Review Letters, vol. 110(26), 266602, Jun. 2013, 7 pp.

Kurkin et al., "Transient Inverse Faraday Effect and Ultrafast Optical Switching of Magnetization," Physical Review B, vol. 78(13), Oct. 2008, 11 pp.

(56) References Cited

OTHER PUBLICATIONS

Lambert et al., "All-optical Control of Ferromagnetic Thin Films and Nanostructures," arXiv preprint arXiv:1403.0784, Mar. 2014, 21 pp.
Le Guyader et al., "Demonstration of Laser Induced Magnetization Reversal in GdFeCo Nanostructures," Applied Physics Letters, vol. 101(2), Jul. 2012, 7 pp.
Liu et al., "Dynamics of Magnetization, Reversal, and Ultrafast Demagnetization of TbFeCo Amorphous Films," Applied Physics Letters, vol. 92(23), Jun. 2008, 5 pp.
Prosecution History from U.S. Appl. No. 14/279,990, dated May 21, 2014 through Jan. 19, 2018, 106 pp.
Lopez-Flores et al., "Time-resolved X-ray Magnetic Circular Dichroism Study of Ultrafast Demagnetization in a CoPd Ferromagnetic Film Excited by Circularly Polarized Laser Pulse," Physical Review B, vol. 86(1), Jul. 2012, 9 pp.
Mangin et al., "Engineered materials for all-optical helicity-dependent magnetic switching." Nature materials, vol. 13(3), Feb. 2014, pp. 286-292.
Mariager et al., "Structural and Magnetic Dynamics of a Laser Induced Phase Transition in FeRh," Physical Review Letters, vol. 108(8), Feb. 2012, 7 pp.
Mathias et al., "Probing the Timescale of the Exchange Interaction in a Ferromagnetic Alloy." Proceedings of the National Academy of Sciences, vol. 109(13), Mar. 2012, pp. 4792-4797.
Mayergoyz et al., "Application of Circularly Polarized Plasmon Resonance Modes to All-Optical Magnetic Recording," Magnetics, IEEE Transactions on, vol. 44(11), Nov. 2008, pp. 3372-3375.
Medapalli et al., "The Role of Magnetization Compensation Point for Efficient Ultrafast Control of Magnetization in Gd24Fe66. 5Co9. 5 alloy," The European Physical Journal B, vol. 86(4), Apr. 2013, pp. 1-4.
Mekonnen et al., "Femtosecond Laser Excitation of Spin Resonances in Amorphous Ferrimagnetic Gd 1-x Co x Alloys." Physical Review Letters, vol. 107(11), Sep. 2011, 4 pp.
Mendil et al., "Resolving the Role of Femtosecond Heated Electrons in Ultrafast Spin Dynamics." Scientific reports, vol. 4, Feb. 2014, 7 pp.
Mentink et al., "Ultrafast Spin Dynamics in Multisublattice Magnets," Physical Review Letters, vol. 108(5), Feb. 2012, 5 pp.
Munzenberg, "Magnetization dynamics: Ferromagnets stirred up," Nature Materials, vol. 9(3), Mar. 2010, pp. 184-185.
Ostler et al., "Ultrafast Heating as a Sufficient Stimulus for Magnetization Reversal in a Ferrimagnet." Nature Communications, vol. 3, Feb. 2012, 6 pp.
Petrila et al., "Micromagnetic Investigation of All-optical Switching," Physics Letters A, vol. 377(21), Apr. 2013, pp. 1495-1498.
Radu et al., "Transient Ferromagnetic-like State Mediating Ultrafast Reversal of Antiferromagnetically Coupled Spins," Nature, vol. 472(7342), Apr. 2011, pp. 205-208.
Rebei et al., "The magneto-optical Barnett Effect in Metals," Journal of Applied Physics, vol. 103(7), Mar. 2008, 7 pp.

Rebei et al., "The Magneto-optical Barnett Effect: Circularly Polarized Light Induced Femtosecond Magnetization Reversal," Physics Letters A, vol. 372(11), Oct. 2007, pp. 1915-1918.
Reid et al., "Optical Excitation of a Forbidden Magnetic Resonance Mode in a Doped Lutetium-iron-garnet Film Via the Inverse Faraday Effect," Physical Review Letters, vol. 105(10), Sep. 2010, 5 pp.
Savoini et al., "Highly Efficient All-optical Switching of Magnetization in GdFeCo Microstructures by Interference-enhanced Absorption of Light," Physical Review B, vol. 86(14), Oct. 2012, 7 pp.
Schubert et al., "All-optical Helicity Dependent Magnetic Switching in an Artificial Zero Moment Magnet," Applied Physics Letters, vol. 104(8), 082406, Feb. 2014, 5 pp.
Stanciu et al., "All-optical Magnetic Recording with Circularly Polarized Light," Physical Review Letters, vol. 99(4), Jul. 2007, 4 pp.
Stanciu et al., "Subpicosecond Magnetization Reversal Across Ferrimagnetic Compensation Points," Physical Review Letters, vol. 99(21), Oct. 2007, 5 pp.
Stanciu et al., "Ultrafast Spin Dynamics Across Compensation Points in Ferrimagnetic GdFeCo: The Role of Angular Momentum Compensation," Physical Review B, vol. 73(22), Jun. 2006, 6 pp.
Steil et al., "All-optical Magnetization Recording by Tailoring Optical Excitation Parameters," Physical Review B, vol. 84(22), Dec. 2011, 10 pp.
Taguchi et al., "Ultrafast Magnetic Vortex Core Switching Driven by the Topological Inverse Faraday Effect," Physical Review Letters, vol. 109(12), Jun. 2012, 11 pp.
Temnov, "Ultrafast Acousto-magneto-plasmonics," Nature Photonics, vol. 6(11), Nov. 2012, pp. 728-736.
Vahaplar et al., "All-optical Magnetization Reversal by Circularly Polarized Laser Pulses: Experiment and Multiscale Modeling," Physical Review B, vol. 85(10), Mar. 2012, 18 pp.
Vahaplar et al., "Ultrafast Path for Optical Magnetization Reversal via a Strongly Nonequilibrium State," Physical Review Letters, vol. 103(11), Sep. 2009, 4 pp. 117201.
Vienne et al., "Magnetic Field Induced by Various Input Beam Polarizations in All-optical Magnetic Recording," Japanese Journal of Applied Physics, vol. 50(9), Sep. 2011, 8 pp.
Wienholdt et al., "THz Switching of Antiferromagnets and Ferrimagnets," Physical Review Letters, vol. 108(24), Jun. 2012, 7 pp.
Woodford, "Conservation of Angular Momentum and the Inverse Faraday Effect," Physical Review B, vol. 79(21), Jun. 2009, 6 pp.
Wu et al., "Observations of Laser Induced Magnetization Dynamics in Co/Pd Multilayers with Coherent X-ray Scattering," Applied Physics Letters, vol. 99(25), Dec. 2011, 4 pp.
Zhang et al., "Paradigm of the Time-resolved Magneto-optical Kerr Effect for Femtosecond Magnetism," Nature Physics, vol. 5(7), Jun. 2009, pp. 499-502.
Hassdenteufel et al., "Thermally Assisted All-Optical Helicity Dependent Magnetic Switching in Amorphous Fe100—xTbx Alloy Films." Advanced Materials, val. 25(22), Jun. 2013, pp. 3122-3128.

* cited by examiner

OPTICAL INTERCONNECT IN SPIN-BASED COMPUTATION AND COMMUNICATION SYSTEMS

This application is a continuation of U.S. patent application Ser. No. 14/279,990, filed May 16, 2014, the entire content of which is incorporated herein by reference.

GOVERNMENT INTEREST

This invention was made with government support under Grant No. HR0011-10-3-0002 awarded by the Department of Defense/Defense Advanced Research Projects Agency (DARPA). The government has certain rights in the invention.

TECHNICAL FIELD

The disclosure relates to spin-based computation and logic systems, and more particularly to interconnect in spin-based computation and logic systems.

BACKGROUND

Power consumption and bandwidth limitation in electrical interconnects is a bottleneck to further improve performance and efficiency of charge-based large scale integrated circuits (ICs), such as those based on a complementary metal-oxide-semiconductor (CMOS) platform and architecture. In charge-based systems, electrical charge is used to represent state variables such as digital bits (e.g., high charge represents a digital high, low charge (or no charge) represents a digital low). Transmitting charge-based representations of digital bits at higher data rates requires additional power and bandwidth, which may not be available.

Spin-based systems can potentially address the limitations of charge-based electrical systems based on CMOS ICs at least with respect to power and architectural constraints of transmitting digital bits at higher data rates. In spin-based systems, an electron spin is used represent state variables. For example, through spin-transfer torque (STT), spins of electrons in one direction in a spin-polarized current cause a magnetic moment of a free layer of a magnetoresistive device (e.g. a magnetic tunneling junction (MTJ), a giant magnetoresistive (GMR) device) to align (e.g., magnetic moment to align) in the same direction (e.g., parallel magnetization state), and spins of electrons in the other direction in the spin-polarized current cause the free layer of the magnetoresistive device to align in the opposite directions (e.g., anti-parallel magnetization state).

In the spin-based systems, the magnetization state of the magnetoresistive devices is indicative of the digital bit. For example, a parallel magnetization state represents a digital low, and an anti-parallel magnetization state represents a digital high, or vice-versa. The magnetization state is read out from the measurement of the resistance value of the magnetoresistive devices, low resistance for the parallel magnetization state and high resistance for the anti-parallel magnetization state.

SUMMARY

This disclosure describes schemes for optical interconnects in spin-based computation and logic systems. In examples of spin-optical interconnect systems described herein, a transmitter converts a spin-based signal to an optical signal for transmission in an optical transport (e.g., optical fiber and optical waveguide), and a receiver converts an optical signal from the optical transport to a spin-based signal for reception. The optical signal may include a series of optical pulses, where the polarization of the optical pulses is indicative of the value of the digital bit. To convert the optical signal to the spin-based signal, the receiver may include a magnetoresistive device in which magnetization state of the device is controlled by the polarization of the optical pulses of the optical signal.

Optical transports (e.g., optical waveguides or fiber optic links) allow for optical signals to travel a relatively long distance at a high data rate, and conversion of spin-based signals to optical signals and back may consume a relatively small amount of power. In this manner, the techniques described in this disclosure may provide a scheme to transmit and receive data over medium to long distances in spin-based computation, logic, and communication systems in a high bandwidth medium and power efficient way without needing to convert the spin-based signals to electrical current-based signals.

In some examples, the techniques utilize the magnetoresistive device to control current and voltage. In such examples, the polarization of an optical signal sets the magnetization state of the magnetoresistive device, and the magnetization state defines the electrical properties of the magnetoresistive device. Accordingly, by setting the magnetization stage of the magnetoresistive device with an optical signal, the techniques configure the electrical properties of the magnetoresistive device to control the current and voltage that is delivered to circuit components.

In one example, the disclosure describes a method of data transfer in a spin-based system, the method comprising receiving an optical signal that represents digital bit values. The method also includes converting the optical signal directly into a spin-based signal without converting the optical signal into a charge-based signal. In this example, the spin-based signal represents the digital bit values of the optical signal by magnetization states of a magnetoresistive device.

In one example, the disclosure describes a device comprising a spin-to-optical transmitter configured to convert a spin-based signal into an optical signal for transmission. The spin-based signal represents digital bit values of the optical signal by magnetization states of a magnetoresistive device. The device also includes an optical-to-spin receiver configured to convert the optical signal back to a spin-based signal for reception.

In one example, the disclosure describes an optical-to-spin receiver comprising an input configured to receive an optical signal that represent digital bit values, and a magnetoresistive device configured to directly convert the optical signal into a spin-based signal. The spin-based signal represents the digital bit values of the optical signal by magnetization states of the magnetoresistive device. The conversion of the optical into the spin-based signal occurs without a conversion of the optical signal into a charge-based signal.

In one example, the disclosure describes a device comprising an input circuit, an output circuit, and a magnetoresistive device having a magnetization state. The magnetoresistive device is configured to receive an optical signal and set a magnetization state of the magnetoresistive device based on the optical signal to control voltage or current from the input circuit that is delivered to the output circuit.

In one example, the disclosure describes a magnetoresistive device comprising a first layer comprising ferromagnetic material having an magnetization direction, a second layer having a magnetization direction configurable based on polarization of light received by the second layer, and a third layer sandwiched between the first layer and the second layer. In this example, the magnetoresistive device is configured to output a signal responsive to an alignment of the magnetization direction of the first layer relative to the magnetization direction of the second layer.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
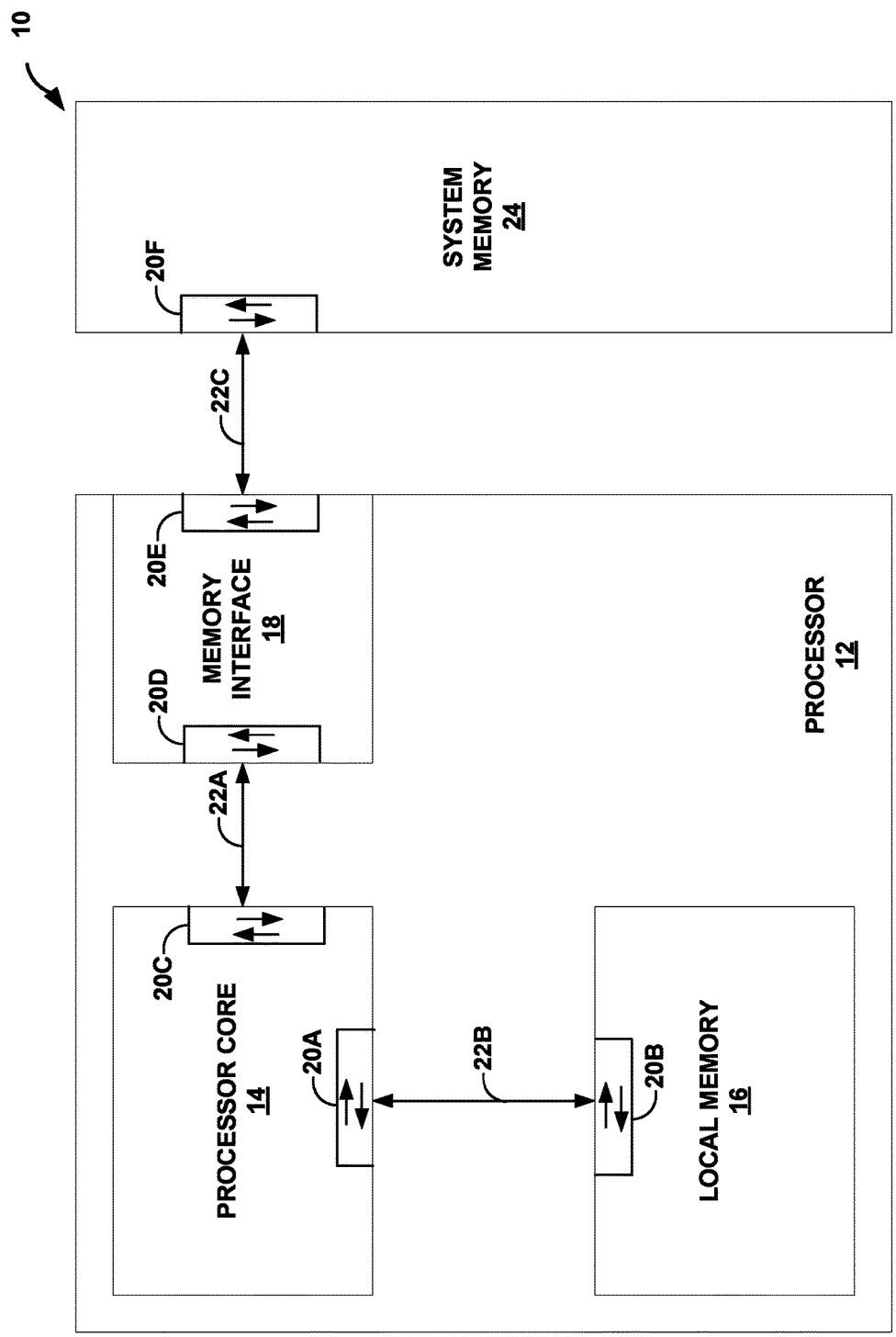
FIG. 1 is a block diagram illustrating a spin-based system with optical interconnect, in accordance with one or more techniques of this disclosure.

FIG. 1 is a block diagram illustrating a spin-based system 10 with optical interconnect, in accordance with one or more techniques of this disclosure. System 10 may be an all spin-based system or a hybrid spin-based system. In the all spin-based system example, all units of system 10, including sub-units within a unit, are spin-based. In the hybrid spin-based system, some of the units or sub-units within a unit are spin-based and others are charge-based. As used in this disclosure, "spin-based" refers to examples in which state variables such as digital bit values are represented by electron spins in a spin-polarized current that set the magnetization states of magnetoresistive devices based on the spin direction, and "charge-based" refers to examples in which state variables such as digital bit values are represented by charge levels (e.g., voltage or current levels).

In a spin-based system, the electron spin direction in a spin-polarized current represents a digital bit value (e.g., one spin direction for a digital high and the other spin direction for a digital low). Because the spin direction of the spin-polarized current sets the magnetization state of a magnetoresistive device (e.g., a magnetic tunnel junction (MTJ) or giant magnetoresistance (GMR) device), the magnetization state of the magnetoresistive device can be indicative of the digital bit value in spin-based systems.

For example, electrons spins in one direction in the spin-polarized current set the magnetoresistive device to a first magnetization state indicative of a digital high and electrons spins in the other direction in the spin-polarized current set the magnetoresistive device to a second magnetization state indicative of a digital low, or vice-versa. However, the spin-polarized current can only diffuse over a relatively short length meaning that after a relatively short distance, the spins of the electrons may no longer be in the same direction in the spin-polarized current (i.e., be depolarized), and the digital bit value indicated by the spin of the electrons may be lost. For example, even in the spin channel materials such as graphene the diffusion length is only a few tens of micrometers. Accordingly, using spin-polarized current to transmit data over medium and long distances (e.g., tens of microns to millimeters) between spin-based units may not be feasible in spin-based systems.

As described in more detail, the disclosure describes using optical interconnect as a way in which to transport spin-based signals optically over medium and long distances, where spin-based signals refer to a series of digital bits that are represented by the magnetization state of a magnetoresistive device or spin-polarized current. In this manner, spin-based signals can be transmitted over relatively longer distances in the form of optical signal without converting the spin-based signals to charge-based signals. For instance, converting spin-based signals to charge-based signals may be inefficient in power consumption and may be limited in bandwidth in a way that using optical interconnect is not (e.g., the bandwidth of electrical wires is far less than the bandwidth of optical transports).

System 10 is an example of a computing system, such as a spin-based computing system. However, the techniques described in this disclosure are not so limited and may be extended to computation, logic, or communication systems, and generally to spin-based systems in which one unit transmits or receives relatively high data rate signals (e.g., in the 10 giga-bits per second range) over a medium to long distance (e.g., tens of micros to millimeters). It should be understood that although the techniques are described with respect to high data rate signals that travel over a medium to long distance, the techniques described in this disclosure may be useable for data signals with low data rates and/or data signals that need to travel relatively short distances.

As illustrated, system 10 includes processor 12 and system memory 24. Processor 12 includes processor core 14, local memory 16, and memory interface 18. Processor 12 may include more units than illustrated in FIG. 1, and processor core 14, local memory 16, and memory interface 18 are illustrated merely to ease with understanding. Other units of processor 12 may communicate in a manner similar to the description below for processor core 14, local memory 16, and memory interface 18.

In some examples, one or more of processor core 14, local memory 16, and memory interface 18 may be spin-based units. For example, processor core 14 may process data using spin-based logic gates, rather than charge-based logic gates, and local memory 16 may store digital bits as magnetization states of magnetoresistive devices within local memory 16. Accordingly, in some examples, processor 12 may be a spin-based system. For instance, in such examples, processor 12 is a spin-based system within the larger spin-based system 10.

System memory 24 is the system memory for system 10. For example, local memory 16 may be memory that only units of processor 12 can access, whereas other units of system 10, including processor 12, access system memory 24. As illustrated, memory interface 18 may be the interface by which processor core 14 stores data to or receives data from system memory 24. In some examples, system memory 24 may store digital bits as magnetization states of magnetoresistive devices within system memory 24. In this sense, system memory 24 may also be a spin-based system that is part of the larger spin-based system 10.

In some examples of processor 12, there may be multiple processor cores 14, each can access its private local memory 16, or they can share a common local memory 16. Multiple process cores 14, local memory 16 and memory interface 18 can be on the same chip of integrated circuits.

In general, the techniques described in this disclosure are implemented by a device. One example of a device is the chip that includes processor 12 (e.g., an integrated circuit (IC) chip). In some examples, system 10 is configured on a circuit board (e.g., processor 12 and system memory 24 are on the same circuit board). The circuit board that includes system 10 is another example of a device. In some examples, system 10 is an appliance in which processor 12 and system memory 24 are located on different boards. Such an appliance that includes system 10 is another example of a device. In some examples, system 10 is configured across different appliances, and a device includes a plurality of different interconnected appliances. There may be different ways to connect components of system 10 in a spin-based system, and each of these different ways may be additional examples of a device configured to implement the example techniques described in this disclosure.

For example, the spin-based units of the device communicate with one another using an optical interconnect. As illustrated in FIG. 1, processor core 14 includes spin-optical transceiver 20A and 20C, local memory 16 includes spin-optical transceiver 20B, memory interface 18 includes spin-optical transceiver 20D and 20E, and system memory 24 includes spin-optical transceiver 20F. Spin-optical transceivers 20A-20F are collectively referred to as "spin-optical transceivers 20."

Each one of spin-optical transceivers 20 includes a spin-to-optical transmitter (referred to simply as transmitter) and an optical-to-spin receiver (referred to simply as receiver). As illustrated, each one of spin-optical transceivers 20 transmits and receives data via respective ones of optical transports 22A-22C (collectively referred to as "optical transports 22"). Examples of optical transports 22 include optical waveguides and fiber optic links. For example, for medium distances such as approximately tens of microns to a few millimeters, optical transports 22 may be optical waveguides. For longer distances such as more than tens of millimeters, optical transports 22 may be fiber optic links. For instance, optical transport 22A is an optical waveguide, and optical transport 22C is a fiber optic link. As described in more detail, in some examples, each one of optical transports 22 may include two optical links, where each optical link is an optical waveguide or a fiber optic link.

As described above, in spin-based system 10, the magnetization state of a magnetoresistive device corresponds to a binary value of a digital bit. One example of a magnetoresistive device is a magnetic tunnel junction (MTJ). An MTJ includes two ferromagnetic layers that sandwich an insulator layer. The magnetization direction of one of the two ferromagnetic layers is fixed, and the magnetization direction of the other of the two ferromagnetic layers can be changed. If the magnetization directions of both the ferromagnetic layers are the same, the MTJ is in a parallel magnetization state with low resistance, and if the magnetization directions of both the ferromagnetic layer are different, the MTJ is in an anti-parallel magnetization state with high resistance. Another example of a magnetoresistive device is a giant magnetoresistive (GMR) device that may function similar to the MTJ. A GMR includes two ferromagnetic layers that sandwich a non-magnetic metal spacer layer.

The parallel magnetization state corresponds to one digital value (e.g., a digital low), and the anti-parallel magnetization state corresponds to the other digital value (e.g., a digital high). The parallel magnetization state corresponding to a digital low and the anti-parallel magnetization state corresponding to a digital high is one example assignment between magnetization state and digital bit values. It should be understood that the parallel magnetization state may correspond to a digital high, and the anti-parallel magnetization state may correspond to a digital low in some examples.

In the techniques described in this disclosure, the transmitters of each one of spin-optical transceivers 20 transmit an optical signal that includes a plurality (e.g., series) of optical pulses via respective optical transports 22 based on the magnetization states of a magnetoresistive device. One example of how the transmitters transmit the optical signal based on the magnetization states of the magnetoresistive device is described in more detail with respect to FIG. 2. Also, in the techniques described in this disclosure, the receivers of each one of spin-optical transceivers 20 receive the optical signal from respective optical transports 22 and convert the optical signal into corresponding magnetization states of a magnetoresistive device. One example of how the receivers convert the optical signal into corresponding magnetization states of a magnetoresistive device is also described in more detail with respect to FIG. 2.

As an illustrative example, when processor core 14 needs to store data (e.g., a series of digital bits) in local memory 16, processor core 14 sets the magnetization state of an MTJ to the magnetization state that corresponds to the first bit in the series of digital bits via a spin-polarized current with electrons in a first or a second spin direction depending on the digital bit value, as one example. The transmitter of spin-optical transceiver 20A outputs an optical pulse based on the magnetization state of the MTJ via optical transport 22B. Processor core 14 then sets the magnetization state of the MTJ to the magnetization state that corresponds to the second bit in the series of digital bits via a spin-polarized current with electrons in the first or second spin direction depending on the digital bit value. The transmitter of spin-optical transceiver 20A outputs an optical pulse based on the magnetization state of the MTJ via optical transport 22B, and so forth until processor core 14 transmits all of the digital bits in the series of digital bits.

In some examples, the duration of the optical pulse may be based on the data rate (e.g., for a 100 giga-bits per second signal, the duration of the optical pulse may be 10 picoseconds, which is the temporal length of a bit). Also, as described in more detail, in some examples, the polarization of the optical pulse is based on the digital bit value that is to be transferred.

On the receive end, the receiver of spin-optical transceiver 20B receives the optical signal for the first bit in the series of digital bits via optical transport 22B and converts the optical pulse into a magnetization state of an MTJ of the receiver that corresponds to the first bit in the series of digital bits based on the polarization of the optical pulse. The receiver of spin-optical transceiver 20B receives the optical pulse for the second bit in the series of digital bits via optical transport 22B and converts the optical signal into a magnetization state of the MTJ of the receiver that corresponds to the second bit in the series of digital bits based on the polarization of the optical pulse, and so forth under local memory 16 receives all of the digital bits in the series of digital bits for storage.

By using optical interconnects (e.g., optical transports 22) to transmit and receive data (e.g., digital bits), system 10 may be configured to transmit and receive data at a relatively high data rate (e.g., 10 giga-bits per second and greater) in a spin-based system over medium and long distances. In some charge-based systems, there may be power and bandwidth limitations to transmitting and receiving data at such high data rates. For instance, electrical interconnects such as wires or transmission lines may limit improvements in the performance and efficiency of a charge-based processor or charge-based system.

Optical interconnect addresses the bandwidth limitations of the electrical interconnect. For example, replacing wires or transmission lines with optical waveguides or fiber optic links boosts the bandwidth and reduces energy consumption as compared to charge-based computation and communication systems.

While optical interconnect may address some of the limitations in charge-based systems, optical interconnect may not be able to overcome some of the other limitations in charge-based systems. As one example, even with optical interconnect, charge-based systems, such as CMOS ICs, may consume a relatively large amount of power to operate at relatively high data rates. There may also be architectural constraints to charge-based CMOS ICs. However, spin-based systems may not need to consume as much power as CMOS ICs to operate at high data rates; nor do spin-based systems have the same architectural constraints as charge-based CMOS ICs, and may therefore allow for performance improvements not available in charge-based systems. For example, spin based systems may be more suitable than charge-based CMOS system to implement non-Boolean primitives and non-von Neumann architectures for neuromorphic systems with applications such as visual recognition and machine learning.

As described above, although spin-based systems may provide advantages over charge-based systems, in some cases, spin-based systems are limited in the distance they can transmit data. For instance, a spin-polarized current has a short diffusion length. This short diffusion length of the spin-polarized current means that it is impractical to interconnect spin devices (e.g., processor core 14, local memory 16, and memory interface 18 of processor 12 as one example) with spin-polarized current directly over medium and long distance (tens of microns to millimeters).

To overcome the limitations of transmitting spin-polarized current over medium to long distances, it may be possible to convert the spin-polarized current to a charge-based current, and transmit the charge-based current over medium and long distances. However, converting to the charge-based current is inefficient in energy and would encounter the same bandwidth limitations described above.

Using spin-optical interconnect system for spin based computation and logic systems, as described in this disclosure, provides the advantages of having spin-based units (e.g., processor 12 and system memory 24 or processor core 14, local memory 16, and memory interface 18 of processor 12) without the limitations of transmitting data only over short distances. For example, converting spin-based signals (e.g., digital bits are represented by magnetization state of magnetoresistive devices) to optical signals allows for data transmission via optical transports 22 along medium or long distances. Also, converting the optical signals back to spin-based signals does not require an intermediate conversion to charge-based current.

Figure 2:
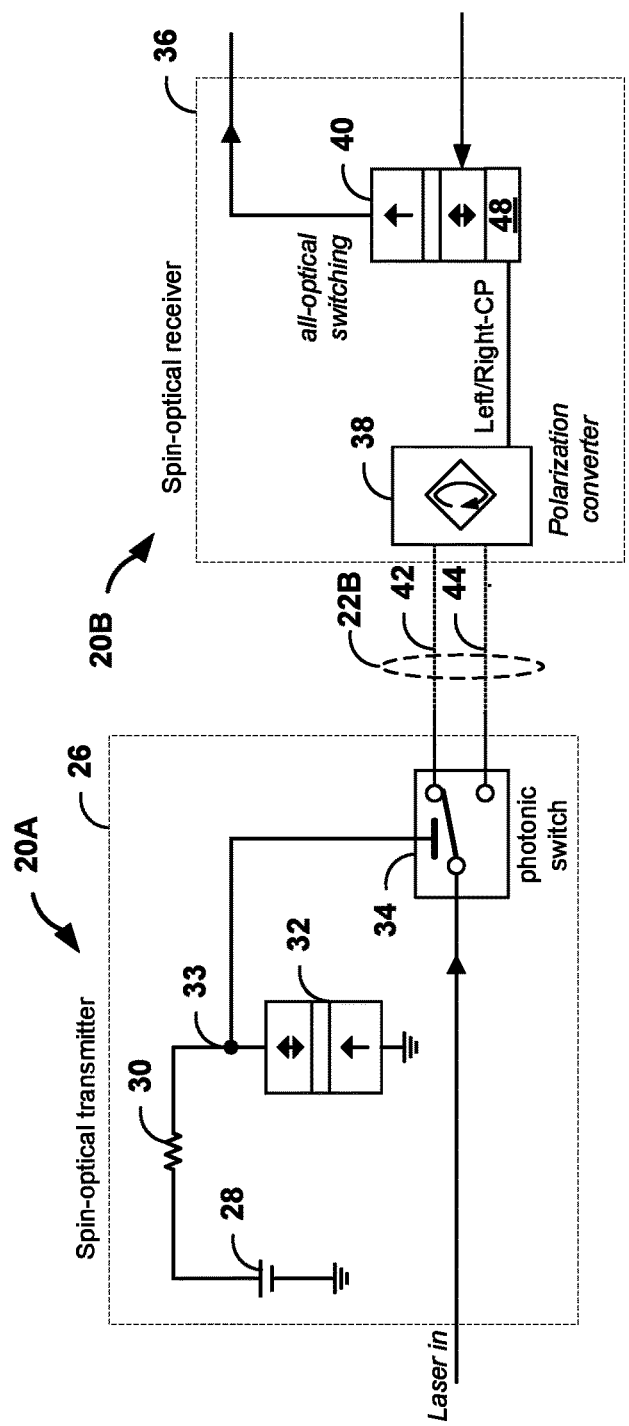
FIG. 2 is a block diagram illustrating an example of a transmitter of a spin-optical transceiver, an optical transport, and a receiver of another spin-optical transceiver, in accordance with one or more techniques of this disclosure.

FIG. 2 is a block diagram illustrating an example of transmitter 26 of spin-optical transceiver 20A, an optical transport 22B, and a receiver 36 of spin-optical transceiver 20B, in accordance with one or more techniques of this disclosure. FIG. 2 illustrates an example of converting a spin-based signal into an optical signal for transmission, and converting the optical signal back to a spin-based signal for reception. As described in more detail, in the techniques described in this disclosure, transmitter 26 converts the spin-based signal into an optical signal without an intervening conversion to a charge-based signal. Similarly, receiver 36 converts the optical signal back to a spin-based signal without an intervening conversion to a charge-based signal.

In FIG. 2, although only transmitter 26 of spin-optical transceiver 20A is illustrated, it should be understood that spin-optical transceiver 20A includes a receiver substantially similar to receiver 36. Also, although only receiver 36 of spin-optical transceiver 20B is illustrated, it should be understood that spin-optical transceiver 20B includes a transmitter similar to transmitter 26. Furthermore, although FIG. 2 illustrates transmitter 26 of spin-optical transceiver 20A and receiver 36 of spin-optical transceiver 20B, spin-optical transceivers 20C-20F each include similar transmitters and receivers.

Also, transmitter 26 and receiver 36 are one example of ways in which to convert spin-based signals to optical signals and optical signals back to spin-based signals. However, the techniques described in this disclosure are not limited to the specific configuration of transmitter 26 and receiver 36. The techniques described in this disclosure describe using a transmitter to convert spin-based signals to optical signals for transmission in an optical transport, and a receiver to convert the optical signals received from the optical transport to the spin-based signal, and transmitter 26 and receiver 36 are merely one example way in which to perform such transmission and reception.

In the example illustrated in FIG. 2, receiver 36 includes magnetoresistive device 40, an example of which is an MTJ or a GMR. Magnetoresistive device 40 may be a special type of MTJ or GMR whose magnetization state is set by polarization of optical pulses. As one example, magnetoresistive device 40 may utilize the helicity-dependent all-optical switching (HD-AOS) effect in thin films of rare-earth (RE) and transition metal (TM) alloys.

For example, ultrafast circular polarized (CP) optical pulses have been used in experiments to manipulate spin states in a broad range of magnetic material systems, including ferromagnetic semiconductors and metals, such as those of magnetoresistive device 40. The right or left CP light applies an effective magnetic field along or opposite, respectively, the direction of light propagation on the material that light is incident on. The application of an effective magnetic field along or opposite the direction of light propagation is referred to as the inverse Faraday effect (IFE).

Using CP light pulses, it is possible to deterministically switch the magnetization state in RE-TM ferrimagnetic film of Gadolinium-Iron-Cobalt (GdFeCo) alloy, as one example, other types of alloys may also be used. For instance, the light of the CP light pulses can be used set the magnetization state of magnetoresistive device 40. In other words, if the layer of magnetoresistive device 40 that can change its magnetization direction is formed from a GdFeCo film, then the magnetization state of magnetoresistive device 40 can be controlled based on the polarization of the received optical pulse when the magnetoresistive device 40 receives the light of the polarized optical pulses.

As illustrated in FIG. 2, grating reflector 48 receives the polarized optical pulses. Magnetoresistive device 40 couples to grating reflector 48, and magnetoresistive device 40 may be arranged perpendicular to the waveguide that carries the optical pulses. Grating reflector 48 bends the optical pulses 90° so that the bottom layer of magnetoresistive device 40 receives the polarized optical pulses. The magnetization state of magnetoresistive device 40 is then set based on the polarization of the optical pulses, where each of the magnetization states of magnetoresistive device 40 corresponds to different digital bit values.

For example, right circular polarized (RCP) light pulse may flip a domain with perpendicular magnetization in the opposite direction of light incidence while left circular polarized (LCP) light may have no effect on such a domain. If the domain magnetization is reversed, the effects of RCP and LCP are also reversed. Accordingly, the magnetization state of magnetoresistive device 40 may only be dependent on the helicity (e.g., LCP or RCP) of the incident light. In this way, the techniques described in this disclosure may utilize the helicity state of the light pulse as a way to transfer digital bits by setting the magnetization state of magnetoresistive device 40 to the magnetization state that corresponds to the transferred digital bits. Stated another way, from the view of data transfer, the helicity dependent all-optical switching (HD-AOS) effect may directly convert the helicity states of the CP light to the spin states of the magnetic material of magnetoresistive device 40.

Figure 3:
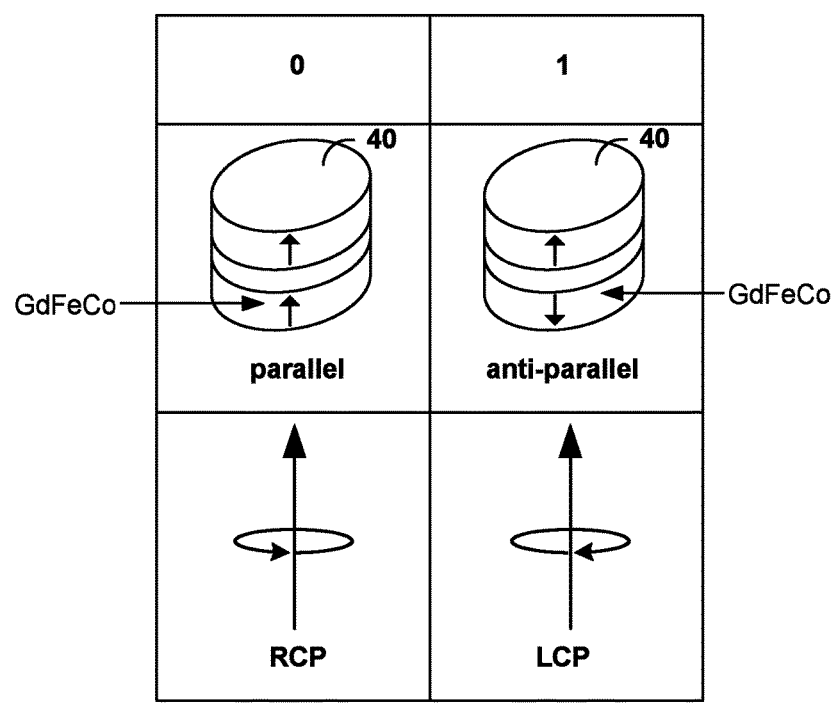
FIG. 3 is a conceptual diagram illustrating an example representation of logical bits by magnetization states and polarization states of circular polarized light, in accordance with one or more techniques of this disclosure.

FIG. 3 is a conceptual diagram illustrating an example representation of logical bits by magnetization states and polarization states of circular polarized light, in accordance with one or more techniques of this disclosure. As illustrated in FIG. 3, a right circular polarized (RCP) light pulse causes the GdFeCo layer of magnetoresistive device 40 to align (e.g., magnetic moment to align) with the top layer of magnetoresistive device 40 in what is referred to as a parallel magnetization state, and a left circular polarized (LCP) light pulse causes the GdFeCo layer of magnetoresistive device 40 to be opposite with the top layer of magnetoresistive device 40 in what is referred to as an anti-parallel magnetization state. In one example, a first helicity state (e.g., RCP) of the light pulse may be associated with a first digital bit value (e.g., a digital low), and a second helicity state (e.g., LCP) of the light pulse may be associated with a second digital bit value (e.g., a digital high).

In some examples, magnetoresistive device 40 may integrate RE-TM alloy film that can be optically switched to a magnetic tunnel junction (MTJ), which is why an MTJ is one example of magnetoresistive device 40. There may be other examples of magnetoresistive device 40 in addition to an MTJ. Another example of magnetoresistive device 40 is a current perpendicular to the plane (CPP) giant magnetoresistance (GMR) device.

In some examples, the magnetic layer in an MTJ or an GMR device that could be switched by HS-AOS could be the composite structure that consists of one RE-TM or TM layer ferromagnetically or antiferromagnetically exchanged coupled with another RE-TM or TM layer. For example, the RE-TM layer may be Terbium-Iron-Cobalt (TbFeCo) with a wide range of composition for the optimal compensation temperature and Curie temperature. Examples of the TM layer include Cobalt (Co), Cobalt-Iron (CoFe) alloy, Cobalt-Iron-Boron (CbFeB) alloy, a plurality of sub-layer pairs that include Cobalt/Palladium (e.g., [Co/Pd]n), or a plurality of sub-layer pairs that includes Cobalt/Platinum (e.g., [Co/Pt] n), etc.

Because the RCP light pulse sets magnetoresistive device 40 in the parallel magnetization state, the parallel magnetization state of magnetoresistive device 40 may correspond to a digital low. Because the LCP light pulse sets magnetoresistive device 40 in the anti-parallel magnetization state, the anti-parallel magnetization state of magnetoresistive device 40 may correspond to a digital high. In this way, if magnetoresistive device 40 receives a RCP light pulse, magnetoresistive device 40 may indicate that a digital low was received, and if magnetoresistive device 40 receives a LCP light pulse, magnetoresistive device 40 may indicate that a digital high was received. The assignment of RCP light pulse to a digital low or setting the magnetization state of magnetoresistive device 40 to the parallel magnetization state, and the assignment of LCP light pulse to a digital high or setting the magnetization state of magnetoresistive device 40 to the anti-parallel magnetization state is provided merely as one example and should not be considered limiting.

Magnetoresistive device 40 may change magnetization states ultrafast with a time constant of less than a few picoseconds. Accordingly, it may be possible to determine the bits of high data rate signals (e.g., 100 giga-bits per second).

As an illustrative example, assume that it takes 2 picoseconds to change the magnetization state of magnetoresistive device 40. Also, assume that magnetoresistive device 10 receives a LCP pulse for 10 picoseconds, a RCP pulse for 10 picoseconds, a LCP pulse for 10 picoseconds, a LCP pulse for 10 picoseconds, a RCP pulse for 10 picoseconds, and a RCP pulse for 10 picoseconds. In this example, 10 picoseconds is selected because 10 picoseconds is the amount of time of a digital high or digital low that corresponds to 100 giga-bits per seconds.

In this example, for the latter 8 picoseconds of the first 10 picoseconds, the magnetization state of magnetoresistive device 40 would be anti-parallel (where the magnetization state transitions to the anti-parallel state in the first 2 picoseconds of the 10 picoseconds). For the latter 8 picoseconds of the next 10 picoseconds, the magnetization state of magnetoresistive device 40 would be parallel (where the magnetization state transitions to the parallel state in the first 2 picoseconds of the 10 picoseconds). For the latter 8 picoseconds of the next 10 picoseconds, the magnetization state of magnetoresistive device 40 would be anti-parallel (again, 2 picoseconds used to transition to the anti-parallel state). For the next 10 picoseconds, the magnetization state of magnetoresistive device 40 would remain in the anti-parallel state. For the latter 8 picoseconds of the next 10 picoseconds, the magnetization state of magnetoresistive device 40 would be in the parallel state, and for the final 10 picoseconds, the magnetization state of magnetoresistive device 40 would be in the parallel state. In this example, if a 100 giga-Hertz clock, centered in the 10 picoseconds of the light pulses, is used to read the magnetization state of magnetoresistive device 40, magnetoresistive device 40 would indicate that receiver 36 received digital bits: 101100.

The exact reason why magnetoresistive device 40 changes states when exposed to polarized light pulses is still under research. For instance, some studies have shown that the ultrafast heating generated by the absorption of ultra-short laser pulses, and not the angular momentum of the laser pulses, causes the switching in the magnetization state. In any event, whatever the cause of the switching in the magnetization state, within a window of pulse energy (e.g., within 10 picosecond laser pulse), deterministic switching can still be achieved using left or right circular polarized (LCP or RCP) laser pulses of a few picoseconds. Also, it should be noted that HD-AOS has also been achieved in other RE-TM materials such as TbFeCo and TbCo and many other magnetic material systems, including ferromagnetic thin films and multilayer structures, synthetic ferromagnetic and ferrimagentic multilayers. Therefore, these example materials can also be used in examples of magnetoresistive device 40 as receivers in this application.

As described above, magnetoresistive device 40 may be a magnetoresistive device whose magnetization state is set by the polarization of light incident to magnetoresistive device 40. The following describes the structure of such an example of magnetoresistive device 40.

Figure 4:
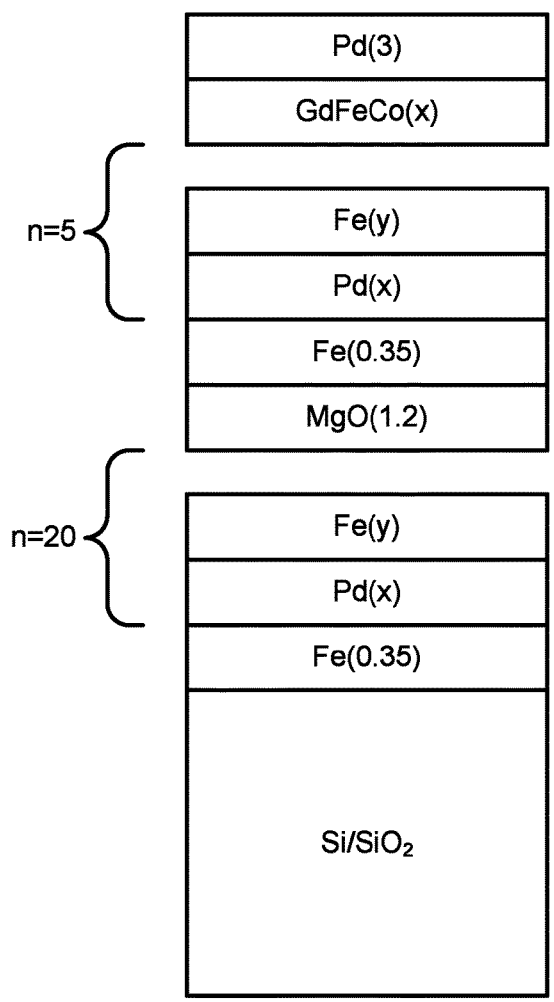
FIG. 4 is a block diagram illustrating an example magnetoresistive device stack structure with optically switchable layer of ferromagnetic film and integrated on silicon substrate, in accordance with one or more techniques of this disclosure.

FIG. 4 is a block diagram illustrating an example magnetoresistive device stack structure with optically switchable layer of ferromagnetic film and integrated on silicon substrate, in accordance with one or more techniques of this disclosure. In the illustrated example, magnetoresistive device 40 is an MTJ with a ferromagnetic film for GdFeCo. In FIG. 4, magnetoresistive device 40 is a hybrid MTJ structure with an optically switchable GdFeCo layer, which is exchange-coupled with a perpendicular free layer composed of multilayers of Fe and Pd, a tunneling junction of MgO layer and fixed, multilayers of Fe and Pd. In the example illustrated in FIG. 4, there are 1-5 multilayers of Fe and Pd in the top layer, and 1-20 multilayers of Fe and Pd in the bottom layer. The thickness of the MgO layer may be approximately 0.6 nm to 1.2 nm (as one example).

After post-annealing, the multilayer structure of [Fe/Pd]n layers or FePd alloy functions as the source of perpendicular anisotropy for the fixed layer and part of the free layer. The multilayer structure may be replaced by other perpendicular material that may have higher magnetoresistance ratio. In some cases, GdFeCo layer or other RE-TM layer may alone be configured with perpendicular anisotropy as well.

In some examples, it may be possible to generate an MTJ structure or GMR with one layer coupled with the HS-AOS. For instance, such example of the magnetoresistive device may include an optical transparent protection layer, HS-AOS sensitive magnetic layer (e.g., layer whose state is set by the helicity), and magnetic layer for anisotropy and magentoresistance tunnel barrier (for MTJ) or spacer layer (for GMR). The MTJ or GMR of such examples may also include a pinned magnetic layer and a pinning magnetic layer. Such examples of magnetoresistive device 40 may be directly coupled to the waveguide that transports the optical pulses starting with the HS-AOS sensitive layer or the protector or seed layer.

In the example of FIG. 4, optical pulses can switch the magnetization of the GdFeCo layer (switchable layer) from parallel to anti-parallel, and the free layer will switch at the same time due to strong exchange-coupled with the switchable GdFeCo layer. In this example, the tunneling magnetoresistance (TMR) of the MTJ may change from low to high so that the optical information is converted to the magnetic states. The example stack structure of magnetoresistive device 40 in FIG. 4 may also improve thermal stability of the switchable layer and increase the TMR ratio of the MTJ. In this manner, the magnetization state of magnetoresistive device 40 indicates the digital bit value in optical-spin receiver 36 in spin-optical interconnect system 10.

In the example illustrated in FIG. 4, the Fe/Pd multilayer may provide the perpendicular anisotropy and low damping constant for both free and fixed layers. Additional examples of the free and fixed layers materials include Co/Pt, Co/Pd multilayer, $L_{10}$FePt, $L_{10}$FePd, $L_{10}$CoPt, $L_{10}$CoPd, CoFeB, or their combination. Additional examples of the tunnel barrier include $Al_2O_3$, BN, graphene, or others. In some examples, the GdFeCo layer could be replaced by TbFeCo, Co/Pt, Co/Pd, multilayer or their synthetic antiferromagnetic structure coupling through a thin Ru layer. For some applications, longitudinal magnetization or tilted magnetization may be used as well.

As described above, one example of magnetoresistive device 40 is an MJT structure. In some examples, such an MTJ structure includes a first layer comprising ferromagnetic material, a second layer whose magnetization direction is configurable based on polarization of light received by the second layer, and an insulator layer sandwiched between the first layer and the second layer. The first layer may be pinned by an antiferromagnetic layer or synthetic antiferromagnetic layer. The second layer may be composed of HS-AOS switchable layer (e.g., switchable based on helicity) and another magnetic layer (e.g., CoFeB, CoFe, etc.) that directly contacts with the tunnel barrier.

Another example of magnetoresistive device 40 is a GMR. Such a GMR may include a first layer comprising ferromagnetic material, a second layer whose magnetization direction is configurable based on polarization of light received by the second layer, and a non-magnetic spacer layer (e.g., Cu, Ag, etc.) sandwiched between the first layer and the second layer. The first layer may be pinned by an antiferromagnetic layer or synthetic antiferromagnetic layer. The second layer may be composed of HS-AOS switchable layer and another magnetic layer (e.g., CoFe, FeNi, etc.).

For example, the first layer of magnetoresistive device 40, in examples where magnetoresistive device is an MTJ or GMR, may be a ferromagnetic material having a magnetization direction, and a second layer having a magnetization direction configurable based on polarization of light received by the second layer. In the techniques described in this disclosure, magnetoresistive device 40 may be configured to output a signal responsive to an alignment of the magnetization direction of the first layer relative to the magnetization direction of the second layer.

For instance, magnetoresistive device 40 may output a signal (e.g., indicate) a digital low or a digital high based on whether the layers of magnetoresistive device 40 are aligned parallel or anti-parallel. In such an example, the signal output by magnetoresistive device 40 may be a spin-based signal in which a respective spin of each electron represents the alignment of the magnetization direction of the first layer relative to the magnetization direction of the second layer. For example, the spin of the spin-polarized current output by magnetoresistive device 40 may be indicative of the digital value, and the spin may be based on the alignment of the magnetization direction of the layers.

Figure 8:
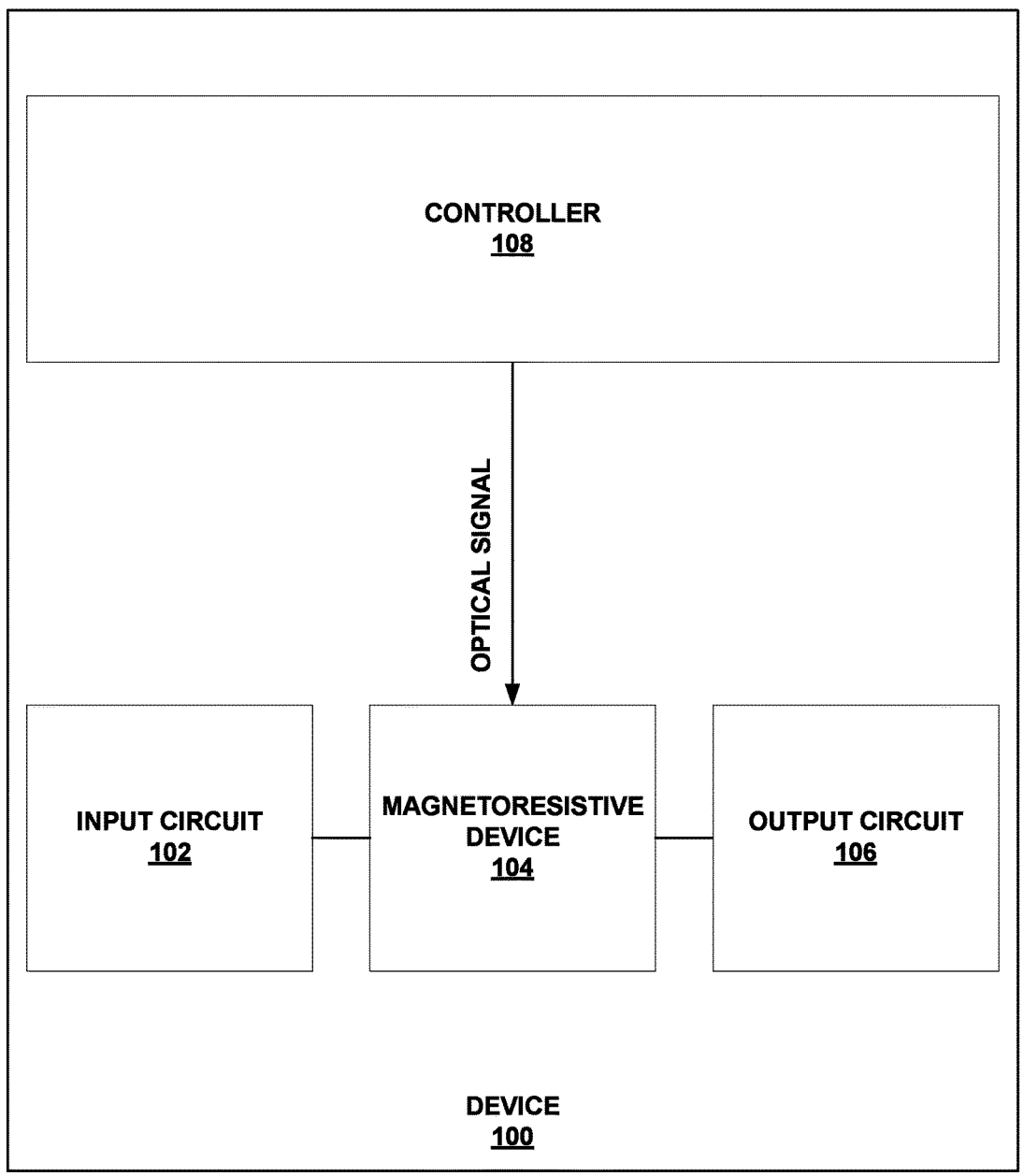
FIG. 8 is a block diagram illustrating one example a device for controlling functional characteristics with a magnetoresistive device, in accordance with one or more techniques of this disclosure.

Some charge-based examples may also utilize a magnetoresistive device, as described with respect to FIG. 8. In such charge-based systems, the optical light may set the magnetization state, which in turn sets the resistance of the magnetoresistive device. In such examples, the output of the magnetoresistive device is based on the resistance of the magnetoresistive device, which is set by the polarization of the light. In other words, the signal output by the magnetoresistive device, such as the one illustrated in FIG. 8 and described in more detail below, may vary in response to a change in resistance of the magnetoresistive device based on the polarization of the light.

Referring back to FIG. 2, there may be many ways in which receiver 36 receives an optical pulse in a first polarization indicative of a first digital bit value and receives an optical pulse in a second polarization indicative of a second digital bit value and FIG. 2 illustrates one example way. For instance, receiver 36 includes polarization converter 38. Polarization converter 38 includes two input ports coupled to optical links 42 and 44 of optical transport 22B and one output port coupled to grating reflector 48 that couples to magnetoresistive device 40. The input ports coupled to optical links 42 and 44 are one example of the input of receiver 36.

Grating reflector 48 may not be needed in every example, such as in examples where it is possible for magnetoresistive device to receive optical pulses directly from polarization converter 38. In examples where magnetoresistive device 40 is arranged perpendicular to polarization converter 38 (e.g., polarization converter 38 is laid out horizontally on a board and magnetoresistive device 40 is coupled vertically to the board), grating reflector 48 may reflect the optical signal 90° so that magnetoresistive device 40 receives the optical pulses.

Figure 5:
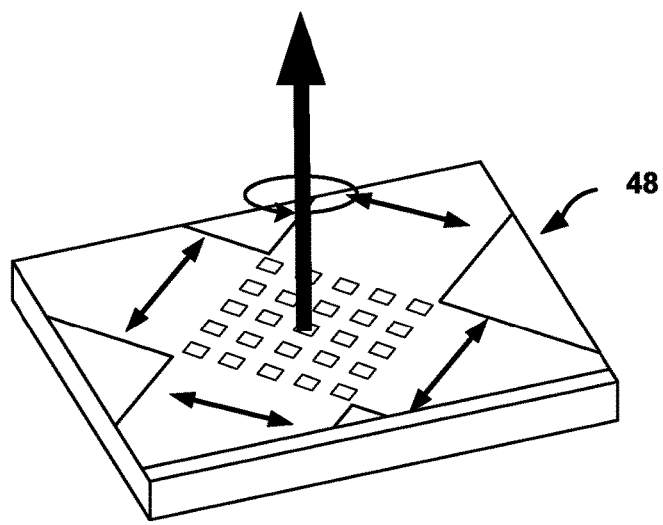
FIG. 5 is a schematic diagram illustrating an example of a 2D grating coupler emitting left circular polarized and right circular polarized optical pulses, respectively, in accordance with one or more techniques of this disclosure.

FIG. 5 is a schematic diagram illustrating an example of a 2D grating coupling emitting left circular polarized and right circular polarized optical pulses, respectively, in accordance with one or more techniques of this disclosure. In particular, FIG. 5 illustrates one example of grating reflector 48. Grating reflector 48 is a 2D grating coupler design that can emit circularly polarized optical pulsed in perpendicular direction. Magnetoresistive device 40 can be directly integrated on top of grating reflector 48 to receive the optical pulses.

Returning to FIG. 2, polarization converter 38 receives a linearly polarized light pulse via either optical link 42 or optical link 44. For example, if receiver 36 is to receive a digital high, receiver 36 receives an optical pulse via optical link 42, and if receiver 36 is to receive a digital low, receiver 36 receives an optical pulse via optical link 44. In other words, receiver 36 receives optical pulses of the optical signal via optical link 42 for the digital bit values equal to a digital low, and receives optical pulses of the optical signal via optical link 44 for the digital bit values equal to digital high.

When receiver 36 receives an optical pulse via optical link 42, polarization converter 38 left circular polarizes the optical pulse and outputs the left circular polarized optical pulse to magnetoresistive device 40 which sets magnetoresistive device 40 into an anti-parallel magnetization state. When receiver 36 receives an optical pulse via optical link 44, polarization converter 38 right circular polarizes the optical pulse and outputs the right circular polarized optical pulse to magnetoresistive device 40 which sets magnetoresistive device 40 into a parallel magnetization state.

As illustrated, receiver 36 converts the optical pulse to a right circular polarized optical pulse or a left circular polarized optical pulse based on whether the optical pulse is received from optical link 42 or optical link 44. However, the techniques described in this disclosure are not so limited.

In some examples, it may be possible to circular polarize the optical pulse at the transmitter 26 end. In these examples, rather than having two optical links 42 and 44, optical transport 22B may include only one optical link. For instance, transmitter 26 may include left or right circular polarizers like polarization converter 38. If transmitter 26 is to transmit a digital high, transmitter 26 may output an optical pulse via the left circular polarizer of transmitter 26 that travels via the single optical link of optical transport 22B, and if transmitter 26 is to transmit a digital low, transmitter 26 may output an optical pulse via the right circular polarizer of transmitter 26 that travels via the single optical link of optical transport 22B.

However, there may be certain drawbacks in polarizing the optical pulse in at transmitter 26, rather than at receiver 36. For example, propagation of circular polarized optical signals in integrated waveguides may not be feasible because of strong material and modal birefringence of the waveguides. For instance, for transmitting and receiving optical signals within processor 12, processor 12 may include optical waveguides that are integrated within integrated circuit of processor 12 (e.g., optical transports 22A and 22B may be optical waveguides). Such optical waveguides may degrade the optical pulse (e.g., via chromatic dispersion) so that the polarization of the optical pulses is lost.

For instance, circular polarized light is composed of two orthogonal linear polarized modes (with a phase difference of $\pm\pi/2$) which propagate with different phase velocity in the waveguides because of its birefringence. Therefore, the final polarization state of the optical pulse may be undetermined (e.g., neither left circular polarized nor right circular polarized, but somewhere in the middle) over a long propagation distance if the birefringence is not controlled.

Controlling the birefringence of the optical waveguide may be difficult. Accordingly, in one example, rather than setting the polarization of the optical pulse at the transmitter 26 end, the techniques set the polarization of the optical pulse at the receiver 36 end. For example, transmitter 26 may transmit linearly polarized optical pulses that are converted to polarized optical pulses by polarization converter 38 to circumvent the degradation caused by the birefringence of the optical waveguide. However, such techniques may utilize two optical links 42 and 44 within optical transport 22B, rather than a single optical link within optical transport 22B.

Accordingly, polarization converter 38 converts optical pulses received at the upper or lower input ports to right circular polarized light or left circular polarized light, respectively, at the output port. In the example techniques described in FIG. 2, transmitter 26 only propagates linearly polarized optical pulses over medium to long distances via two input waveguides (e.g., optical links 42 and 44 of optical transport 22B). In this manner, transmitter 26 may not need to encode information in the helicity states of the light pulses. Instead, transmitter 26 may encode the digital bit values of the spin-based signal into the two optical links 42 and 44 that carry the digital high or a digital low, respectively, to polarization converter 38.

Also, although magnetoresistive device 40 is illustrated as being external to polarization converter 38, the techniques described in this disclosure are not so limited. In some examples, to further minimize the effects of birefringence, magnetoresistive device 40 may be integrated with polarization converter 38. In this manner, an additional optical waveguide may not be needed from the output of polarization converter 38 to magnetoresistive device 40.

FIG. 2 also illustrates transmitter 26, which includes voltage source 28, resistor 30, magnetoresistive device 32, and photonic switch 34. Magnetoresistive device 32 may be different than magnetoresistive device 40. For example, magnetoresistive device 40 may a type of magnetoresistive device whose magnetization states are configurable based on the polarization of the optical pulse that magnetoresistive device 40 receives. The magnetization state of magnetoresistive device 32 may not need to be configurable based on the polarization of light.

Magnetoresistive device 32 may be an MTJ or a GMR. One of the characteristics of magnetoresistive device 32 may be that the resistance of magnetoresistive device 32 is a function of the magnetization state. For example, in the parallel magnetization state, the electrical resistance of magnetoresistive device 32 may be lower than when magnetoresistive device 32 is in the anti-parallel magnetization state.

In this manner, the voltage at node 33 may be a function of the magnetization state of magnetoresistive device 32. For instance, resistor 30 and magnetoresistive device 32 form a voltage divider that divide the output voltage of voltage source 28, and the voltage at node 33 is the divided voltage. Accordingly, if magnetoresistive device 32 is in the parallel magnetization state, the voltage at node 33 may be less than if magnetoresistive device 32 is in the anti-parallel magnetization state. In other words, if magnetoresistive device 32 is in the parallel magnetization state, the voltage at node 33 is at a first voltage level, and if magnetoresistive device 32 is in the anti-parallel magnetization state, the voltage at node 33 is a second voltage level. In this example, the first voltage level is less than the second voltage level.

As illustrated, the voltage at node 33 drives photonic switch 34, and photonics switch 34 receives as input a linearly polarized laser. One example of photonic switch 34 is a silicon micro-ring resonator based optical switch. If magnetoresistive device 32 is in the parallel magnetization state, which corresponds to a digital low, the voltage at node 33 is at the first voltage level. In this example, the voltage at node 33 being at the first voltage level causes photonic switch 34 to output the linearly polarized laser via optical link 44. If magnetoresistive device 32 is in the anti-parallel magnetization state, which corresponds to a digital high, the voltage at node 33 is at the second voltage level. In this example, the voltage at node 33 being at the second voltage level causes photonic switch 34 to output the linearly polarized laser via optical link 42.

There may be various ways in which to control the magnetization state of magnetoresistive device 32. As one example, a spin-based polarized current may set the magnetization state of magnetoresistive device 32. For instance, the spin-based polarized current may set the magnetization state of magnetoresistive device 32 every 100 picoseconds, which means that photonic switch 34 transmits an optical pulse of the linearly polarized laser for 100 picoseconds. In this manner, transmitter 26 may convert spin-based signals to optical signals for transmission at a relatively high data rate (e.g., 10 giga-bits per second in this example). As described above, receiver 36 receives the optical pulses representative of digital bit values and converts the optical pulses into spin-based digital bit values to complete the optical interconnect and transfer of data from transmitter 26 to receiver 36.

In some examples, photonics switch 34 may be capable of transmitting data at more than 10 giga-bits per second with energy consumption of less than 50 fJ/bit. The performance of such photonics switches is improving for data transmission at even greater data rates. Therefore, such photonic switches may be well suited for spin-to-optical conversion for high bandwidth, low power data communication in spin-based systems.

However, it should be understood that receiver 36 may receive optical pulses in ways other than the way in which transmitter 26 transmits the optical pulses. For example, a transmitter that is configured in a way other than transmitter 26 may transmit spin-to-optical converted data signals to receiver 36. Similarly, a receiver that is configured in a way other than receiver 36 may receive optical pulses from transmitter 26.

Figure 6:
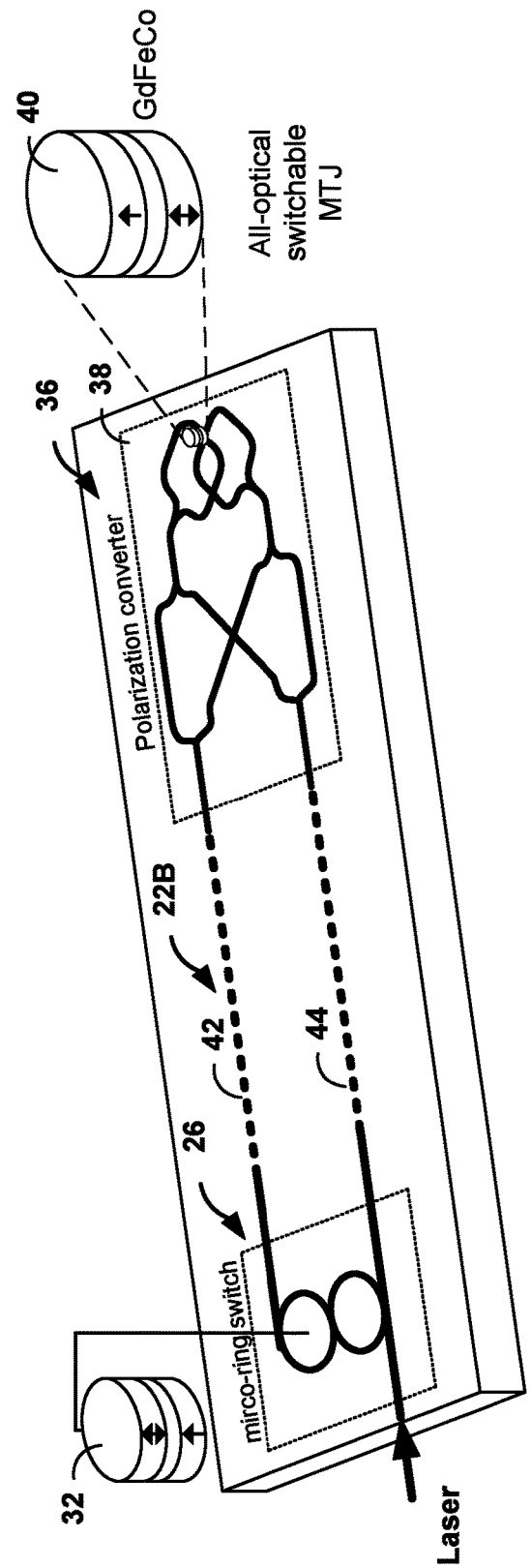
FIG. 6 is a schematic diagram of the example illustrated in FIG. 2.

FIG. 6 is a schematic diagram of the example illustrated in FIG. 2. As illustrated in FIG. 6, the micro-ring switch, which is one example of photonics switch 34, receives the laser input. Based on magnetization state of magnetoresistive device 32, the micro-ring switch outputs the optical pulse from the laser via optical link 42 or optical link 44 of optical transport 22B. Polarization converter 38 receives the optical pulse via optical link 42 or optical link 44 and left or right circular polarizes the optical pulse based on whether polarization converter 38 receives the optical pulse via optical link 42 or optical link 44. The GdFeCo layer of magnetoresistive device 40 receives the polarized optical pulse via grating reflector 48 (not shown in FIG. 6) and sets its magnetization state based on the polarization.

In this way, this disclosure describes examples of spin-optical interconnect systems that includes a spin-to-optical transmitter and an optical-to-spin receiver that are interconnected with integrated optical waveguides or fibers. The transmitter converts spin information (e.g., a digital bit value represented by the electron spins of a spin-polarized current that sets a magnetization state of a magnetoresistive device) to an optical signal. In the illustrated examples, the optical signal indicates whether a digital high or low is transmitted based on the polarization or the pathway of the optical signals. In some examples, the transmitter (e.g., transmitter 26) may indicate whether the optical signal represents a digital high or a low based on the amplitude or phase modulation.

The optical signal may transmit through optical waveguides integrated on the chip (e.g., optical waveguides in optical transports 22A and 22B that are integrated on the chip of processor 14) over a medium distance of tens of microns to a few millimeters. In some examples, the optical signal may transmit through fiber optics (e.g., fiber optics in optical transport 22C) over a long distance such as over tens of millimeters.

The optical-to-spin receiver converts the optical signal back to spin information by all-optical switching of magnetization of a magnetic device (e.g., a digital bit value indicated by the magnetization state of magnetoresistive device 40). As described above, the magnetization state of magnetoresistive device 40 can be deterministically controlled by either the direct angular momentum transform from the optical pulses to magnetic domains or by ultrafast heating in the material induced by the optical pulses.

Figure 7:
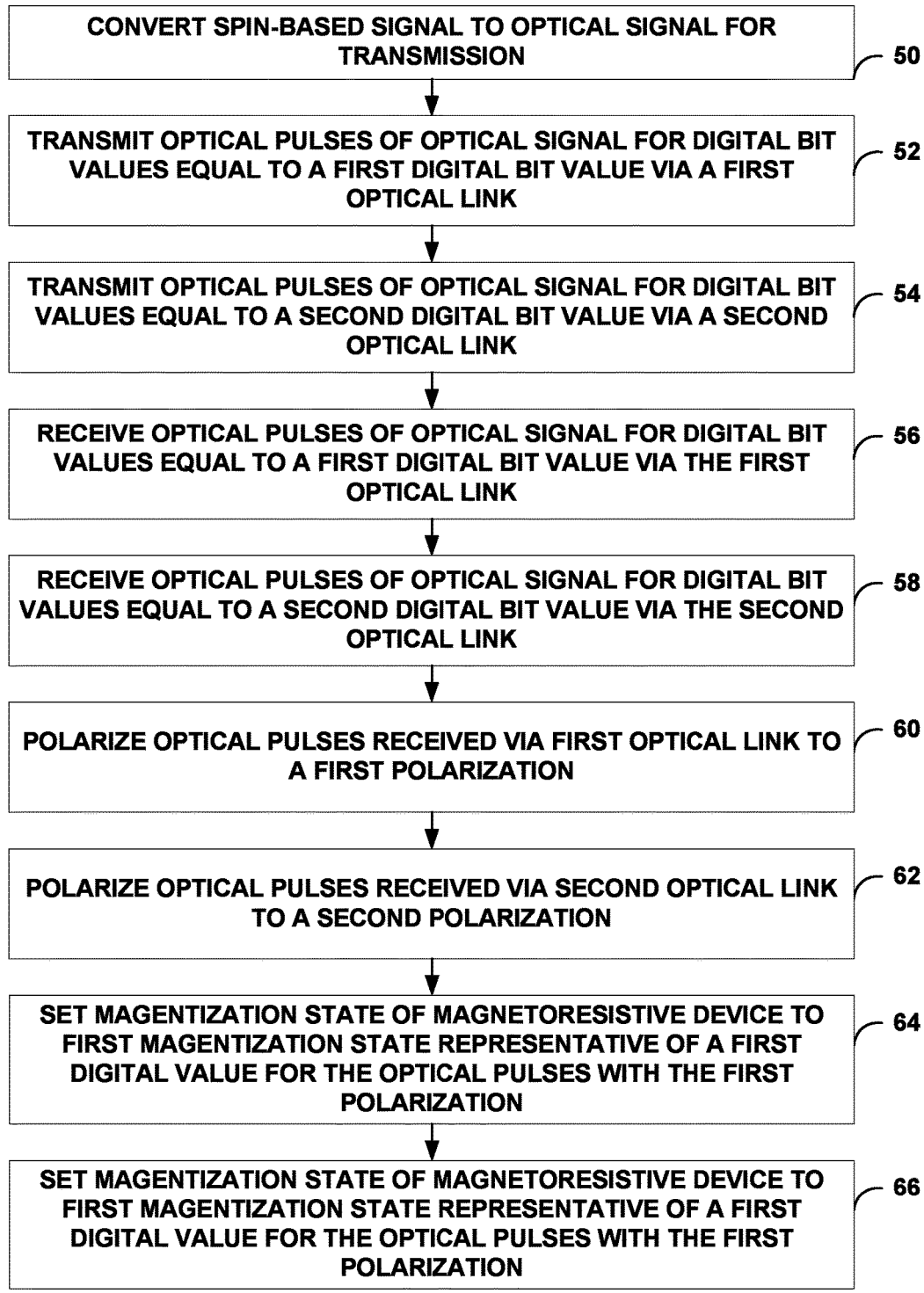
FIG. 7 is a flowchart illustrating one example technique in accordance with the disclosure.

FIG. 7 is a flowchart illustrating one example technique in accordance with the disclosure. As illustrated, transmitter 26 converts spin-based signal to an optical signal for transmission (50). As described above, the spin-based signal includes digital bit values represented by magnetization states of a magnetoresistive device.

Transmitter 26 transmits optical pulses of the optical signal for digital bit values equal to a first digital bit value via a first optical link (52), and transmits optical pulses of the optical signal for digital bit values equal to a second digital bit value via a second optical link (54). For example, the voltage at node 33 causes photonics switch 34 to output the laser via optical link 42 for digital bit values equal to a digital high and to output the laser via optical link 44 for digital bit values equal to a digital low.

Receiver 36 receives optical pulses of the optical signal for digital bit values equal to a first digital bit value via the first optical link (56), and receives optical pulses of the optical signal for digital bit values equal to a second digital bit value via the second optical link (58). Polarization converter 38 of receiver 36 polarizes optical pulses received via the first optical link to a first polarization (60), and polarizes optical pulses received via the second optical link to a second polarization (62).

To convert the optical signal back to a spin-based signal, magnetoresistive device 40 sets its magnetization state to a first magnetization state representative of a first digital value for the optical pulses with the first polarization (64), and sets its magnetization state to a second magnetization state representative of a second digital value for the optical pulses with the second polarization (66). For example, the light of the left circular polarized optical pulses sets magnetoresistive device 40 into the anti-parallel magnetization state, which is representative of a digital high. The light of the right circular polarized optical pulses sets magnetoresistive device 40 into the parallel magnetization state, which is representative of a digital low.

FIG. 8 is a block diagram illustrating one example device 100 for controlling functional characteristics with magnetoresistive device 104, in accordance with one or more techniques of this disclosure. Similar to FIG. 1, examples of device 100 include a chip comprising one or more integrate circuits, a board that includes the components of device 100 illustrated in FIG. 8, and one or more appliances.

As illustrated, device 100 includes input circuit 102, magnetoresistive device 104, output circuit 106, and controller 108. In one example, input circuit 102 and output circuit 106 may be charge-based circuits. For instance, input circuit 102 may be configured to deliver voltage or current output circuit 106. Input circuit 102 may be a voltage source or a current source. In some examples where input circuit 102 and output circuit 106 are charge-based circuits, input circuit 102 may be driver. Output circuit 106 includes circuitry that receives voltage or current. For instance, output circuit 106 may be a load driven by input circuit 102. Output circuit 106 may include one or more components that receive power from input circuit 102.

As described above, input circuit 102 and output circuit 106 may be charge-based circuits (e.g., operate with voltages and currents) or hybrid circuits (hybrid of spin-based and charge-based). However, the techniques described in this disclosure are not so limited. In some examples, input circuit 102 and output circuit 106 may be spin-based components. In general, input circuit 102 and output circuit 106 may be spin-based, hybrid, or charge-based circuits, where input circuit 102 outputs to output circuit 106.

For illustration, input circuit 102 and output circuit 106 are described as charge-based circuits.

Magnetoresistive device 104 may be similar to magnetoresistive device 40, in some examples. For example, like magnetoresistive device 40, the polarization of an optical pulse sets the magnetization state of magnetoresistive device 104. However, whereas magnetoresistive device 40 facilitated data transfer, magnetoresistive device 104 may function to control the interconnection between input circuit 102 and output circuit 106.

For example, the resistance of magnetoresistive device 104 is a function of the magnetization state of magnetoresistive device 104 (low resistance for parallel magnetization state and high resistance for anti-parallel magnetization state). Controller 108 may output an optical signal, via an optical waveguide or fiber optic link, with a specific polarization based on whether magnetoresistive device 104 is to be low resistance or high resistance. For example, similar to above, right circular polarized optical pulses may set magnetoresistive device 104 to the parallel magnetization state and left circular polarized optical pulses may set magnetoresistive device 104 to the anti-parallel magnetization state (or vice-versa).

Controller 108 may determine the amount of voltage or current that output circuit 106 is to receive and set the magnetization state of magnetoresistive device 104 with the appropriate polarized optical pulse based on the determination. For example, if input circuit 102 is a voltage source, controller 108 may determine the amount of voltage or current that output circuit 106 should receive. If the voltage or current at output circuit 106 is to be relatively high, controller 108 may set the magnetization state of magnetoresistive device 104 to the parallel magnetization state (low resistance state). If the voltage or current at output circuit 106 is to be relatively low, controller 108 may set the magnetization state of magnetoresistive device 104 to the anti-parallel magnetization state (high resistance state).

In the above example, magnetization device 104 is describes as functioning as a resistive element. However, the techniques described in this disclosure are not so limited. In some examples, magnetization device 104 may function as form of a switch. For example, magnetization device 104 may be a transistor with a MTJ or GMR built on the transistor, where the magnetization state of the MTJ or GMR is controllable by the polarization of the optical pulse outputted by controller 108.

As one example, assume that the MTJ or GMR is built on the gate of the transistor, and the drain of the transistor is connected to input circuit 102 and the source of the transistor is connected to output circuit 106, or a collector of the transistor is connected to input circuit 102 and the emitter of the transistor is connected to output circuit 106. In this example, assume that if the MTJ or GMR is in the anti-parallel magnetization state (e.g., high resistance), the transistor is in the cutoff mode. Also, assume that if the MTJ or GMR is in the parallel magnetization state (e.g., low resistance), the transistor is the active mode.

In such an example, if controller 108 determines that output circuit 106 should not receive any current, controller 108 may output an optical pulse that sets the magnetization state of the MTJ or GMR to the anti-parallel magnetization state so that the transistor is turned off and no current from input circuit 102 can flow to output circuit 106. If controller 108 determines that output circuit 106 should receive current, controller 108 may output an optical pulse that sets the magnetization state of the MTJ or GMR to the parallel magnetization state so that the transistor is turned on and current from input circuit 102 flows to output circuit 106. In this way, magnetoresistive device 104 may function as a switch that allows or blocks current from flowing from input circuit 102 to output circuit 106.

Accordingly, in some examples, magnetoresistive device 104 is configured to receive an optical signal from controller 108 and set a magnetization state based on the optical signal. In some examples, controller 108 may set the magnetization state of magnetoresistive device 104 to control an amount of voltage or current from input circuit 102 that is delivered to output circuit 106.

In some examples, such as those of spin-based systems, the magnetization state of magnetoresistive device 104 may control the flow of spin-polarize current between input circuit 102 and output circuit 106 (e.g., in examples where input circuit 102 and output circuit 106 are spin-based circuits). Accordingly, even in examples where input circuit 102 and output circuit 106 are spin-based, magnetoresistive device 104 may be configured to receive an optical signal and set a magnetization state based on the optical signal to control current (e.g., spin-polarize current) from input circuit 102 that is delivered to output circuit 106. In charge-based examples of input circuit 102 and output circuit 106, magnetoresistive device 104 may be configured to receive an optical signal and set a magnetization state based on the optical signal to control current or voltage (e.g., an amount of current or voltage) from input circuit 102 that is delivered to output circuit 106.

Various aspects of the disclosure have been described. These and other aspects are within the scope of the following claims.

Example 1

A method of data transfer in a spin-based system, the method comprising converting a spin-based signal into an optical signal for transmission, wherein the spin-based signal comprises digital bit values represented by magnetization states of a magnetoresistive device, and converting the optical signal back to a spin-based signal for reception.

Example 2

The method of example 1, wherein converting the spin-based signal into the optical signal comprises converting the spin-based signal directly into the optical signal without an intervening conversion to a charge-based signal, wherein the charge-based signal represents digital bit values using voltage or current.

Example 3

The method of any of examples 1 and 2, wherein converting the optical signal back to the spin-based signal comprises converting the optical signal directly into the spin-based signal without an intervening conversion to a charge-based signal, wherein the charge-based signal represents digital bit values using voltage or current.

Example 4

The method of any of examples 1-3, further comprising transmitting optical pulses of the optical signal for digital bit values equal to a first digital bit value via a first optical link, and transmitting optical pulses of the optical signal for digital bit values equal to a second digital bit value via a second optical link.

Example 5

The method of any of examples 1-4, further comprising receiving optical pulses of the optical signal for digital bit values equal to a first digital bit value via a first optical link, and receiving optical pulses of the optical signal for digital bit values equal to a second digital bit value via a second optical link.

Example 6

The method of example 5, wherein the magnetoresistive device comprises a first magnetoresistive device, the method further comprising polarizing the optical pulses of the optical signals received via the first optical link to a first polarization, and polarizing the optical pulses of the optical signals received via the second optical link to a second polarization, wherein converting the optical signal back to the spin-based signal comprises receiving with a second magnetoresistive device the light of the optical pulses with the first polarization and the optical pulses with the second polarization, setting a magnetization state of the second magnetoresistive device to a first magnetization state representative of a first digital value for the optical pulses with the first polarization, and setting a magnetization state of the second magnetoresistive device to a second magnetization state representative of a second digital value for the optical pulses with the second polarization.

Example 7

A method comprising receiving light of an optical signal with a magnetoresistive device, and setting a magnetization state of the magnetoresistive device based on the light of the optical signal.

Example 8

A method of data transfer in a spin-based system, the method comprising converting a spin-based signal into an optical signal, wherein the spin-based signal comprises digital bit values represented by magnetization states of a magnetoresistive device, and transmitting the optical signal.

Example 9

The method of example 8, wherein transmitting the optical signal comprises transmitting optical pulses of the optical signal via a first optical link for the digital bit values equal to a first digital bit value, and transmitting optical pulses of the optical signal via a second optical link for the digital bit values equal to a second digital bit value.

Example 10

An optical-to-spin receiver comprising a magnetoresistive device configured to receive light an optical signal, wherein a magnetization state of the magnetoresistive device is set by the light of the optical signal.

Example 11

A system comprising a spin-to-optical transmitter configured to convert a spin-based signal into an optical signal, wherein the spin-based signal comprises digital bit values represented by magnetization states of a magnetoresistive device, and transmit the optical signal.

What is claimed is:
1. A device comprising:
an input circuit;
an output circuit; and
a magnetoresistive device coupled to the input circuit and the output circuit,
wherein the magnetoresistive device is configured to receive light of an optical signal at a layer of the magnetoresistive device, wherein the magnetoresistive device is configured such that a resistance of the magnetoresistive device is set responsive to a polarization of the light of the optical signal, and wherein the magnetoresistive device is configured to control delivery of voltage or current from the input circuit to the output circuit based on the resistance of the magnetoresistive device.

2. The device of claim 1, further comprising a controller configured to output the optical signal.

3. The device of claim 1, wherein the magnetoresistive device is configured to receive light of the optical signal having a first polarization or a second polarization, wherein the magnetoresistive device is configured such that the resistance is set to a first resistance responsive to the light of the optical signal having the first polarization, and wherein the magnetoresistive device is configured such that the resistance is set to a second resistance responsive to the light of the optical signal having the second polarization.

4. The device of claim 3, wherein when the resistance of the magnetoresistive device is at the first resistance, the magnetoresistive device is configured to cause voltage at an output of the input circuit to be substantially equal to voltage at an input of the output circuit and current to flow from the output of the input circuit to the input of the output circuit, and wherein when the resistance of the magnetoresistive device is at the second resistance, the magnetoresistive device is configured to cause voltage at the input of the output circuit to not equal to the input circuit and current to not flow from the output of the input circuit to the input of the output circuit.

5. The device of claim 1, wherein the magnetoresistive device comprises one of a magnetic tunnel junction (MTJ) and a giant magnetoresistive (GMR) device.

6. The device of claim 1, wherein the layer of the magnetoresistive device that receives the optical signal comprises one of Gadolinium-Iron-Cobalt (GdFeCo) alloy, Terbium-Iron-Cobalt (TbFeCo) alloy, Cobalt (Co), Cobalt-Iron (CoFe) alloy, Cobalt-Iron-Boron (CbFeB) alloy, a plurality of sub-layer pairs that include Cobalt/Palladium, or a plurality of sub-layer pairs that includes Cobalt/Platinum.

7. The device of claim 1, wherein the magnetoresistive device is configured such that the resistance of the magnetoresistive device is set by the polarization of the light of the optical signal and without an intervening conversion to a charge-based signal.

8. The device of claim 1, further comprising:
a transistor,
wherein the magnetoresistive device is built on a gate of the transistor, wherein the input circuit is connected to a first terminal of the transistor and the output circuit is connected to a second terminal of the transistor, and wherein the magnetoresistive device is configured to control whether the transistor operates in cutoff mode to stop flow of current from the input circuit to the output circuit or operates in active mode to allow flow of current from input circuit to output circuit responsive to polarization of the light of the optical signal.

9. The device of claim 1, wherein the input circuit and the output circuit are each charge-based circuits, spin-based circuits, or hybrid of spin-based and charge-based circuits.

10. A device comprising:
an input circuit;
an output circuit;
a magnetoresistive device coupled to the input circuit and the output circuit; and
a controller configured to output light of an optical signal having a first polarization or a second polarization at a layer of the magnetoresistive device to set a resistance of the magnetoresistive device and control voltage or current delivered to the output circuit from the input circuit.

11. The device of claim 10, wherein the magnetoresistive device is configured such that the resistance is set to a first resistance responsive to the light of the optical signal having the first polarization, and wherein the magnetoresistive device is configured such that the resistance is set to a second resistance responsive to the light of the optical signal having the second polarization.

12. The device of claim 11, wherein when the resistance of the magnetoresistive device is at the first resistance, the magnetoresistive device is configured to cause voltage at an output of the input circuit to be substantially equal to voltage at an input of the output circuit and current to flow from the output of the input circuit to the input of the output circuit, and wherein when the resistance of the magnetoresistive device is at the second resistance, the magnetoresistive device is configured to cause voltage at the input of the output circuit to not equal to the input circuit and current to not flow from the output of the input circuit to the input of the output circuit.

13. The device of claim 10, wherein the magnetoresistive device comprises one of a magnetic tunnel junction (MTJ) and a giant magnetoresistive (GMR) device.

14. The device of claim 10, wherein the layer of the magnetoresistive device that receives the optical signal comprises one of Gadolinium-Iron-Cobalt (GdFeCo) alloy, Terbium-Iron-Cobalt (TbFeCo) alloy, Cobalt (Co), Cobalt-Iron (CoFe) alloy, Cobalt-Iron-Boron (CbFeB) alloy, a plurality of sub-layer pairs that include Cobalt/Palladium, or a plurality of sub-layer pairs that includes Cobalt/Platinum.

15. The device of claim 10, wherein the magnetoresistive device is configured such that the resistance of the magnetoresistive device is set by the polarization of the light of the optical signal and without an intervening conversion to a charge-based signal.

16. The device of claim 10, further comprising:
a transistor,
wherein the magnetoresistive device is built on a gate of the transistor, wherein the input circuit is connected to a first terminal of the transistor and the output circuit is connected to a second terminal of the transistor, and wherein the magnetoresistive device is configured to control whether the transistor operates in cutoff mode to stop flow of current from the input circuit to the output circuit or operates in active mode to allow flow of current from input circuit to output circuit responsive to polarization of the light of the optical signal.

17. The device of claim 10, wherein the input circuit and the output circuit are each charge-based circuits, spin-based circuits, or hybrid of spin-based and charge-based circuits.

18. A method comprising:
outputting light of an optical signal having a first polarization or a second polarization at a layer of a magnetoresistive device, wherein the magnetoresistive device is configured such that a resistance of the magnetoresistive device is set to a first resistance or a second resistance responsive to the light of the optical signal having the first polarization or the second polarization; and
delivering voltage or current from an input circuit to an output circuit based on the resistance of the magnetoresistive device, wherein the input circuit and the output circuit are coupled to the magnetoresistive device.

19. The method of claim 18, wherein the magnetoresistive device is configured such that the resistance of the magnetoresistive device is set by the polarization of the light of the optical signal and without an intervening conversion to a charge-based signal.

20. The method of claim 18, wherein the input circuit and the output circuit are each charge-based circuits, spin-based circuits, or hybrid of spin-based and charge-based circuits.

* * * * *